Jan. 12, 1954
D. DASSO
2,665,657
SPEED CONTROLLED WARNING SIGNAL
Filed Nov. 28, 1949
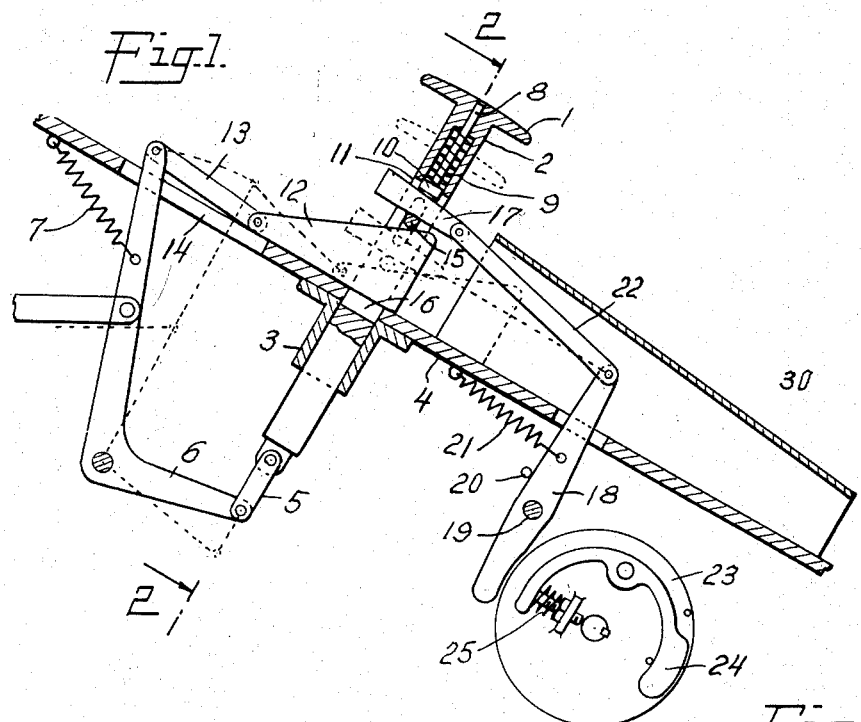
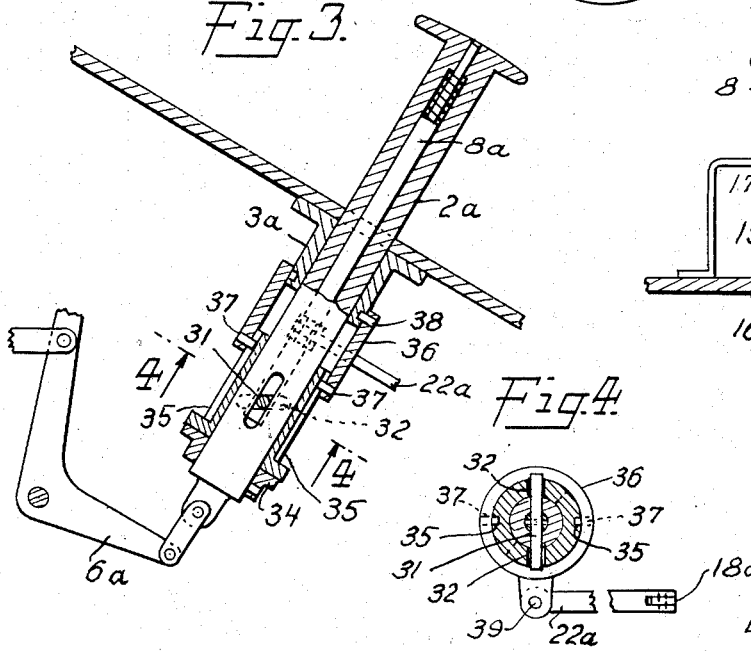
INVENTOR.
DAVID DASSO
BY
ATTORNEYS Patented Jan. 12, 1954

2,665,657

UNITED STATES PATENT OFFICE 2,665,657

SPEED CONTROLLED WARNING SIGNAL

David Dasso, Lima, Peru

Application November 28, 1949, Serial No. 129,800

9 Claims. (Cl. 116—57)

This invention relates to speed indicators for automobiles and has for its object the provision of a speed indicator associated with the throttle actuating pedal in such manner as to positively notify the operator through the foot on the pedal that a predetermined speed has been reached, but without changing or tending to change the position of the pedal.

A further object of the invention is to provide an indicator of the character described wherein the signal is of a nature such that the natural reaction of the foot to the signal is the lifting of the foot, thereby insuring the quickest possible reaction to the signal.

A further object of the invention is to provide a signal of the character described which may readily be applied to existing cars with little change in the construction and arrangement of the speed controlling mechanisms now employed and which may likewise be incorporated in new cars with little additional cost.

In the accompanying drawings,

Fig. 1 is a vertical sectional view on the longitudinal plane of the throttle pedal showing one form of my improved signal;

Fig. 2 is a sectional view on line 2—2 of Fig. 1;

Fig. 3 is a sectional view showing a modified form; and

Fig. 4 is a section on line 4—4 of Fig. 3.

Referring to the drawings and particularly to Fig. 1, 1 indicates the accelerator or throttle pedal here shown as formed on the top of a tubular stem 2 mounted for axial movement in a bearing 3 attached to the under side of the floor board 4 of the car. Connected to the lower end of the stem 2 by a link 5 is the throttle-actuating bell crank 6 which is biased by a spring 7 in a direction to hold the throttle closed and the stem 2 in elevated position. The mechanism so far described constitutes a conventional throttle-actuating mechanism.

My improved warning system as added to the described throttle mechanism comprises a pin 8 mounted for movement in an axial bore in the upper end of the stem 2. The upper end of the pin 8 is normally flush with the face of the pedal 1. A spring 9 surrounds the lower end of pin 8 between the upper end of the enlarged portion of the bore in the stem 2 and a button 10 formed on the lower end of the pin 8. The stem 8 has a transverse slot 11 (see Fig. 2) in which is mounted a pin 15.

The stem 2 is provided with a second slot 16 at right angles to the slot 11 and intersecting the slot 11. A wedge 12 extends through a slot 16 and is supported on the floor of the car in a position to be shifted back and forth by means of a link 13 extending forwardly from the small end of the wedge and connected at its end to the upper end of the bell crank 6 which projects through a slot 14 in the floor board of the car. The pin 15 is projected through the slot 11 beneath the button 10 and rests on the inclined face of the wedge 12. Mounted in the slot 16 between the button 10 and pin 15 is a second wedge 17 whose smaller end is attached to a speed-responsive device which will now be described. This device, as shown, consists of lever 18 fulcrumed on a fixed pin 19 on the frame of the car at a convenient point beneath the floor, the lever being held normally against a stop pin 20 by a spring 21. The upper end of the lever 18 projects through a slot in the floor of the car and is connected by a link 22 to the small end of the wedge 17.

As the accelerator 1 is moved down to increase the speed of the car, the wedge 12 is moved back by its connection with the bell crank 6. In like manner when the accelerator is elevated by the spring 7 the wedge 12 is pulled forward to thereby move the signal member 8 substantially in synchronism with the movement of the accelerator during the usual movement of the accelerator in controlling the speed of the car. The wedge 17 is also moved slightly back and forth by its connection with the end of the lever 18 which is normally held in fixed position by the spring 21 and the slope of the two wedges is such that the pin 8 is in all positions of the accelerator maintained in the same position with respect to the accelerator pedal 1 and the top of the pin 8 will be held flush with the surface of the pedal. When, however, the lever 18 is moved away from the stop pin 20 the wedge 17 will be drawn backward, thereby elevating the pin 8 against the foot of the driver. A shield 30 may be attached to the floor of the car overlying the link 22 to serve as a foot rest when the driver's foot is removed from the accelerator.

The speed-actuated device for shifting the lever 18 comprises a disk 23 driven by any suitable connection, not shown, at a speed varying with the speed of the car. A flexible shaft such as employed for driving the usual speedometer may be employed. Pivoted to the face of the disk 23 is a weighted lever 24 held by a spring 25 so that the outer face of the weighted end of the lever is flush with the periphery of the disk 23. The weighted lever 24 lies adjacent the lower end of the lever 18 so that when the speed for which the governor is set is exceeded, the weighted end of the lever 24 will be thrown outwardly to engage the lever 18 at each rotation of the disk and thereby through the connection described produce a rapid tapping on the bottom of the driver's foot but without shifting the accelerator pedal or otherwise interfering with the operation of the car. The natural and instant reaction to a tapping on the bottom of the foot is to lift the foot and thereby reduce the speed of the car, but if the operator is purposely speeding to pass another vehicle he may continue the pressure on the accelerator and maintain his speed.

The adjustable wedge 12 not only serves to adjust the signal member 8 in synchronism with the position of the throttle pedal 1 so that the relative position of the two parts remains constant except when the signal member is vibrated by the speed-responsive member, but also serves as a fixed abutment for the signal member so that the reaction of the vibration of the signal member will not be transmitted to the throttle pedal and throttle actuating linkage.

In Figs. 3 and 4 I have shown a modification of the mechanism for operating the signal. As here shown the pin 8a is extended to a point below the floor in the stem 2a and at its lower end is provided with a cross pin 31 which projects at each end through slots in the stem 2a into inclined slots 32 formed in a sleeve 33 supported for rotation about the lower end of the stem 2a by a collar 34. The sleeve 33 is provided with keyways 35 and surrounding the sleeve 33 is a second sleeve 36 which is connected to the sleeve 33 for rotation therewith by means of pins 37 extending into the keyways 35. At its upper end the sleeve 36 is mounted for rotation on the bearing 3a of the stem 2a, the sleeve 36 being held in place by a pin 38 projecting into a circumferential groove on the bearing 3a. The link 22a is connected to a pin 39 in the side of the sleeve 36 and extends to the upper end of the lever 18a.

In operation the sleeve 33 moves freely up and down with the accelerator within the sleeve 36 which is held against rotation by the link 22a so long as the predetermined speed is exceeded. When, however, the centrifugal weight 24 is thrown outwardly to engage the end of the lever 18a the sleeve 36 will be oscillated on the bearing 3a and thus cause the pin 8a to tap rapidly against the foot of the driver.

In the foregoing specification and accompanying drawings I have disclosed in detail two alternate forms of my invention wherein the speed warning signal is given to the automobile driver by tapping the foot resting on the accelerator pedal. It will be obvious, however, that the speed-responsive device and the connection between the speed-responsive device and the signaling member may be variously modified.

It will also be understood that the invention may be applied to other types of manually operated controls to notify the operator by contact with the hand or foot engaging the operating member that a condition exists which requires action on the part of the operator to maintain the desired conditions. For example, the arrangement of parts shown may be combined with a torque-responsive device instead of a speed-responsive device, as illustrated. Such an arrangement would be desirable for application to trucks, tractors and locomotives to notify the operator when the load on the engine exceeds the desired maximum so that he may reduce the truck speed or shift his gears to increase the ratio of engine and vehicle speed before the overload has resulted in overheating or other damage to the engine. It is to be understood that the claims are not limited to the application of the invention to speed control, but cover all other applications thereof which fall within their scope.

It will also be obvious that instead of tapping the sole of the driver's foot the warning signal may be elsewhere applied and that the devices shown and described may be otherwise variously modified without departing from the spirit of the invention or the scope of the appended claims.

I claim:

1. In a speed-responsive signal for automobiles and the like, the combination of a speed-controlling member adapted to be engaged and shifted by the driver to control the speed of the vehicle, a signal member associated with said speed-controlling member and at speeds less than a predetermined speed lying wholly back of the surface of said speed-controlling device at the location engaged by the operator, a speed-responsive device, means for operating said device at speeds proportional to the speed of the vehicle, connections between said signal member and said speed-responsive device for projecting said signal member beyond said surface when the vehicle exceeds said predetermined speed.

2. In a speed-responsive signal for automobiles and the like, the combination of a speed-controlling member adapted to be engaged and shifted by the driver to control the speed of the vehicle, a signal member positioned wholly within said speed-controlling member at speeds less than a predetermined speed, a speed-responsive device, means for operating said device at speeds proportional to the speed of the vehicle, and connections between said signal member and said speed-responsive device for projecting said signal member beyond the surface of said speed-controlling member when the vehicle exceeds said predetermined speed.

3. In a speed-responsive signal for automobiles and the like, the combination of a speed-controlling member adapted to be engaged and shifted by the driver to control the speed of the vehicle, a signal member associated with said speed-controlling member and located in position adjacent the portion of said speed control which is engaged by the operator in controlling the vehicle, means for moving said signal member in synchronism with the movement of said speed-controlling member, a speed-responsive device, means for operating said device at speeds proportional to the speed of the vehicle, and connections between said signal member and said speed-responsive device for shifting said signal member independently of said speed-controlling member when the vehicle exceeds a predetermined speed.

4. In a speed warning signal for automobiles and the like, the combination with the throttle pedal of the vehicle of a signal member carried thereby and movable therewith, means for maintaining the surface of the signal member substantially flush with the surface of the throttle pedal in varying positions of pedal adjustment at speeds less than a predetermined speed, a speed-responsive device adapted to shift when the vehicle exceeds said predetermined speed, and operating connections between said signal member and said speed-responsive device for projecting the said signal member above the surface of the throttle pedal when said predetermined speed is exceeded and irrespective of the position of the throttle pedal.

5. In a speed warning signal for automobiles and the like, the combination with the throttle pedal of the vehicle of a signal member carried thereby and movable therewith, means for maintaining the surface of the signal member substantially flush with the surface of the throttle pedal in varying positions of pedal adjustment at speeds less than a predetermined speed, a speed-responsive device comprising a rotating weight mounted to move radially outward when the vehicle exceeds said predetermined speed, and an operating member connected to said signal member and positioned to be engaged by said weight in its outward position for projecting said signal member above the surface of the throttle pedal.

6. In a speed warning signal for automobiles and the like, the combination with the throttle pedal of the vehicle of a signal member carried thereby and movable therewith to maintain the surface of the signal member substantially flush with the surface of the throttle pedal in varying positions of pedal adjustment, a speed-responsive device comprising a rotating weight mounted to move radially outward when the vehicle exceeds a predetermined figure, and an operating member connected to said signal member and positioned to be struck by said weight in its outward position at one point in its rotation for projecting said signal member above the surface of the throttle pedal and a spring pressing downwardly on said member.

7. In a speed warning signal for automobiles and the like, the combination with the throttle pedal of the vehicle of a signal member carried thereby and movable therewith during the speed-controlling movement of said pedal, and a rotating speed-responsive device having a part which is shifted when the vehicle exceeds a predetermined figure, and operating connections between said part and said signal for vibrating said member when said minimum speed is exceeded irrespective of the position of the throttle pedal.

8. In a signal device for indicating a predetermined operating condition the combination of a control member adapted to be engaged and manipulated by an operator to control the operation of the apparatus to which the signal is applied, a signal member associated with said control member and located in a position adjacent the portion of said control member which is engaged by the operator controlling the apparatus, a device responsive to the predetermined condition to be indicated, and connections between said signal member and said device for moving said signal member relatively to said control member when said predetermined condition exists.

9. In a signal device for indicating a pretermined operating condition, the combination of a control member adapted to be engaged and manipulated by an operator to control the operation of the apparatus to which the signal is applied, a signal member associated with said control member and located in a position adjacent the portion of said control member which is engaged by the operator in controlling the apparatus, a device responsive to the predetermined condition to be indicated, connections between said signal member and control member for maintaining the same in the same relative positions during the normal control movements of said control member, and means for moving said signal member independently of the control member when said predetermined condition exists.

DAVID DASSO.

References Cited in the file of this patent

UNITED STATES PATENTS

| Number | Name | Date |
| --- | --- | --- |
| 1,025,607 | Berliner et al. | May 7, 1912 |
| 1,722,314 | Ryan | July 30, 1929 |
| 2,359,191 | Bayston | Sept. 26, 1944 |
| 2,519,859 | Teetor | Aug. 22, 1950 |